Figure 1:
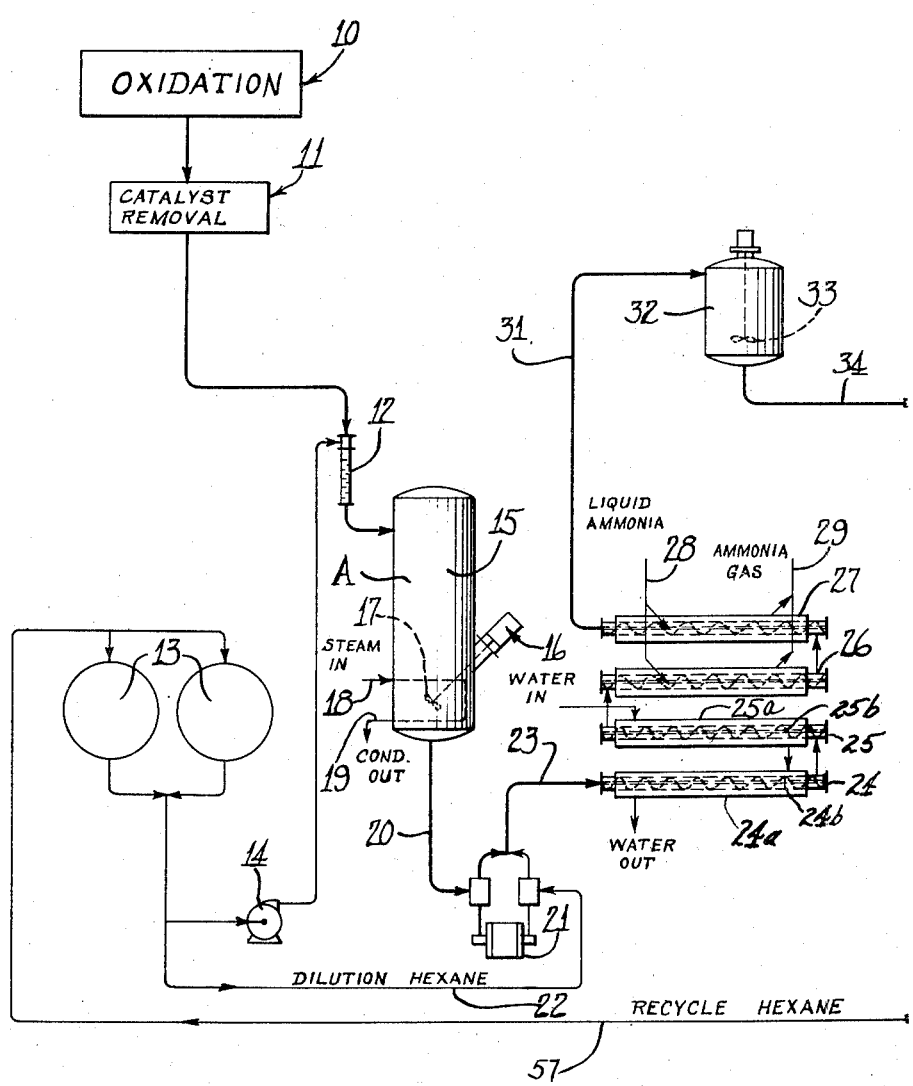

Jan. 29, 1957  G. L. MEYERS ET AL  2,779,779
OXIDIZED WAX AND METHOD OF MAKING SAME
Filed Feb. 17, 1955  2 Sheets-Sheet 1

Inventors
George L. Meyers
Gerald W DeWalt
Leonard M. Keene
Attys

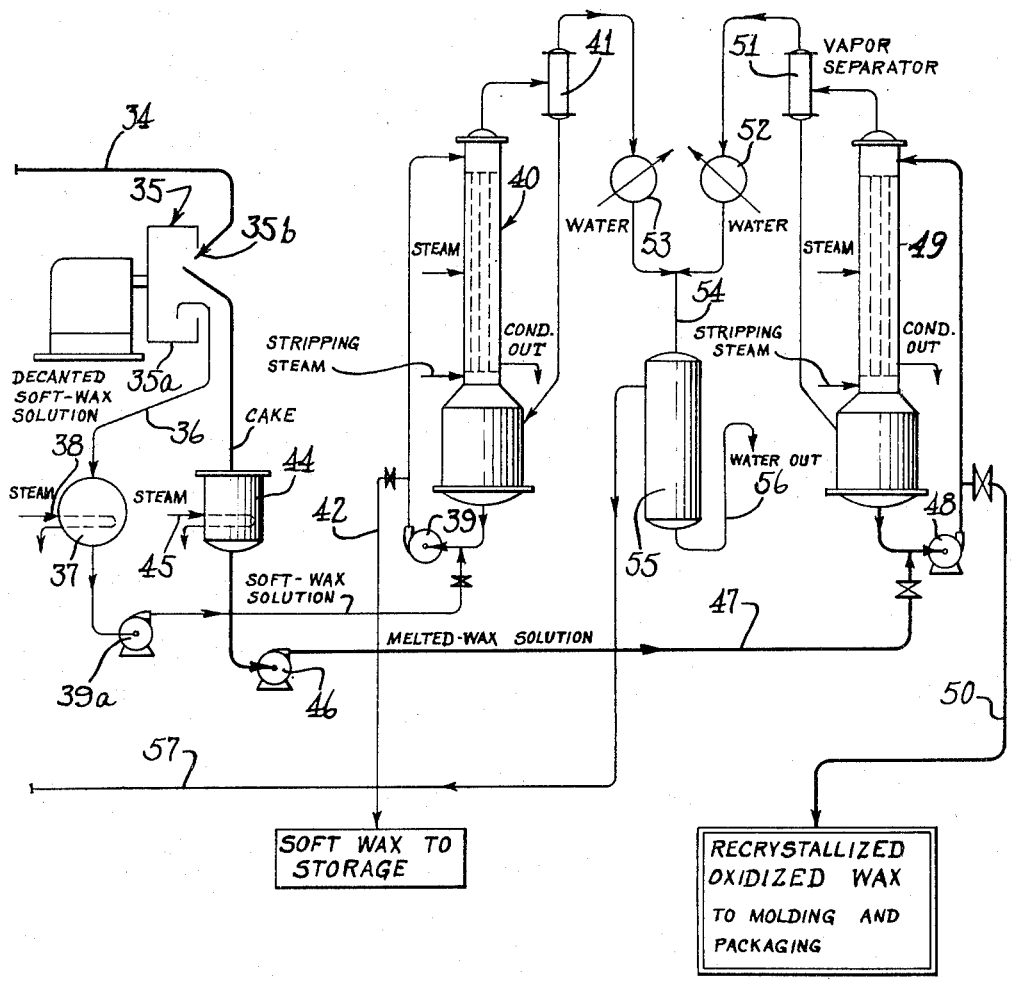

United States Patent Office 2,779,779
Patented Jan. 29, 1957

2,779,779

OXIDIZED WAX AND METHOD OF MAKING SAME

George L. Meyers, Gerald W. De Walt, and Leonard M. Keene, Barnsdall, Okla., assignors, by mesne assignments, to Petrolite Corporation, St. Louis, Mo., a corporation of Delaware Application February 17, 1955, Serial No. 488,863

12 Claims. (Cl. 260—452)

The present invention is directed to an improved method for the manufacture of waxes, and is particularly directed to a method for the recovery of oxidized microcrystalline wax fractions having improved physical properties.

While the process of the present invention is applicable to the separation of oxidized waxes into fractions having different physical characteristics, regardless of the use to which the wax fractions are ultimately put, the process has particular applicability to the manufacture of relatively hard, oxidized microcrystalline wax products.

The oxidized microcrystalline waxes are important commercially because of their property of water emulsifiability. The waxes of this type find particular application in the field of polish manufacture, where they are employed to replace the more expensive vegetable waxes. For this particular use, it is desired to provide a hard, high melting product with a controlled acid and saponification number.

The separation of the oxidized microcrystalline waxes into fractions of relatively hard and relatively soft waxes is particularly troublesome because waxes of this type have a tendency to be heat sensitive. Even short periods of heating applied to microcrystalline wax fractions containing both the hard and soft components will frequently cause permanent discoloration of the product.

Attempts to isolate selected portions of the mixture by means of selective solubility in various solvents have not always proved to be effective because with some solvents, the tacky materials which normally appear in the softer wax fractions are frequently carried over with the hard wax fractions. Even where solvents were employed which could selectively dissolve one wax fraction and leave the other, recrystallization of the materials from the solvent frequently yielded materials which could not be easily separated from the liquid phase by filtration, centrifugal separation, or the like.

As a result, separation of oxidized microcrystalline waxes into fractions having desired melting point ranges and hardness characteristics have not always produced commercially acceptable products. The present invention overcomes this difficulty and provides an economical process for separating a substantially non-tacky, hard, high melting point fraction from admixture with other oxidized microcrystalline waxes.

An object of the present invention is to provide an improved process for the recovery of selected oxidized wax fractions.

Another object of the invention is to provide an improved method for the separation of oxidized microcrystalline wax mixtures into two or more fractions, one of which contains a substantial proportion of a hard, high melting point, non-tacky material particularly useful in the manufacture of polishing preparations.

Another object of the present invention is to provide a means for separating a relatively hard microcrystalline wax fraction from a relatively soft fraction without subjecting the fractions at any time to substantial risk of damage by elevated temperatures.

A still further object of the present invention is to provide an improved method for the separation of a microcrystalline wax oxidation product into a relatively hard and a relatively soft fraction, with the tacky materials normally present in such reaction product being carried through into the relatively soft fraction.

One of the primary features of the present invention consists in subjecting an oxidized microcrystalline wax mixture containing both hard and soft components to dissolution in a predominantly paraffinic acyclic hydrocarbon solvent capable of completely dissolving the wax mixture, and then crystallizing out the relatively hard components of the wax, substantially free from tacky components, by a process of controlled cooling. We have found that through the use of the solvents mentioned, in the manner described, the relatively hard components will precipitate out as quite coarse, filterable or centrifugable crystals, while the low melting soft components, including the tacky components, remain in solution in the solvent. This separation is accomplished without loss of the emulsifiability in the hard wax fraction thus recovered, and apparently with the added advantage that the hard wax fraction is less heat sensitive than the starting mixture of hard and soft waxes.

The solvent properties important for the purposes of the present invention are (1) polarity, (2) paraffinicity, (3) boiling point or boiling range, and (4) surface tension.

The solvent selected for this process should be non-polar in order to avoid removal of all oxidized fractions from the wax. Through the use of a nonpolar solvent the process of crystallization is able to separate the soft, oxidized wax fractions on the basis of melting point and hardness, rather than on the basis of their degree of oxidation or their polarity. Consequently, we are able to recover a very hard wax which retains a sufficient quantity of higher melting point oxidized fractions to give a product which emulsifies easily.

Of prime importance in the present invention is the paraffinicity of the solvent, as we have found that the hard wax fractions crystallize from paraffinic, acyclic solvents as coarse, granular particles which can be separated from the solvent solutions quite simply by conventional means. In comparison, the crystals which form in saturated cyclic or aromatic solvents are more difficult if not impossible to separate from the solvent solutions by conventional means, due to the formation of gel structures which retain extremely large volumes of the solvent solutions. As a measure of paraffinicity, we employ the Kauri-Butanol value (ASTM D1133–50T) and the aniline point determination (ASTM D 611–53T). The best solvents for our purpose have a maximum Kauri-Butanol value of 35 and a minimum aniline point of 130° F.

We also prefer to use the low boiling point solvents because this permits solvent removal without excessive heating which might cause darkening of the waxes. Consequently, we prefer to use the hydrocarbons from pentane to heptane since these may be removed in a falling film evaporator at temperatures below 250° F., at atmospheric pressures. With the use of vacuum in the falling film evaporator, the paraffinic solvents up to nonane may be employed. For most convenient operation, we prefer that the boiling point of the solvent not exceed about 310° F., in the case of a relatively pure compound, or that at least 90% of the material be distilled over at a temperature of 310° F., in the case of a mixture.

There also seems to be a relationship between surface tension of the solvent and solvation of wax crystals and agglomerates. Consequently, we prefer to use those solvents which have a surface tension under about 26 dynes per centimeter. This includes the hydrocarbons having from 5 to 9 carbon atoms in the molecule, and excludes the aromatic hydrocarbons having 6 to 9 carbon atoms per molecule.

The solvents which we employ in the process of the present invention are predominantly paraffinic acyclic hydrocarbons, and broadly in the range from $C_5$ to $C_9$ preferably in the range from $C_5$ to $C_7$. By this we mean that the solvent has a sufficient concentration of hydrocarbons in the range from 5 carbon atoms to 9 carbon atoms to the molecule to dissolve completely the oxidized microcrystalline wax mixture. Hence, it is possible to employ various petroleum fractions as the solvent, without the necessity of fractionating to recover the relatively pure pentane-to-nonane hydrocarbons, provided the concentration of these hydrocarbons in the petroleum fraction is sufficiently high to dissolve the waxes. Where possible, we prefer however, to employ the relatively pure hydrocarbon, particularly hexane (n-hexane). Apparently, the hydrocarbons in the range from 5 to 7 carbon atoms have a more pronounced selective solubility for the soft wax components and tacky components of the oxidized wax mixture at the temperatures employed for separation. Rapid cooling of the wax containing solvent has been found to precipitate the higher melting point, harder wax fraction as a coarse, readily separable precipitate, without impairing the recovery of the soft wax fraction from the solvent.

In the drawings:

A further description of the present invention will be made in conjunction with the attached drawings in which:

Figure 1 is a somewhat schematic flow chart for the process of the invention; and Figure 2 is a continuation of Figure 1.

As shown on the drawings:

In the initial step of the process, the microcrystalline wax is subjected to an oxidation in an oxidation stage generally designated at numeral 10 in the drawings. The oxidation stage 10 contains heating and cooling means which control the temperature at the desired point. It also contains an air inlet means which may take the form of a dispersing sparger. After the temperature has been adjusted, the preferred temperature being about 260° F., an oxidation catalyst such as cobalt stearate or manganese stearate is added to the unoxidized wax which has been charged into the vessel. Air is added in sufficient quantities to disperse the catalyst, and finally the air rate is adjusted to a value in the neighborhood of 3.0 cubic feet per hour pound of wax (measured at 60° F., and 14.7 pounds per square inch pressure absolute). Normally, the catalyst concentration in the mixture will be about 0.15% by weight of the wax charged.

The oxidation procedure described above is more or less conventional and, when employed in the past, has usually been carried out for a period of about eight hours, in which time the wax will normally achieve a saponification number of 50 to 60. For our purposes, we prefer to carry the oxidation in this initial stage somewhat longer than has heretofore practiced. We prefer to carry out the oxidation for a period of about 10 hours or at least until the saponification number is within the range from about 60 to about 75. Actually, we have successfully separated hard wax fractions by the process of the present invention when the initial oxidation is carried out to a saponification number as low as 35 or as high as 100, but the best products appear to be provided when the initial oxidation is terminated at a saponification number of 60 to 75.

The oxidation is carried out as a batch procedure, and after the elapsed time interval, the oxidation mass is transferred to a catalyst removal zone, indicated at numeral 11 of the drawing, where the suspended catalyst is removed from the wax as by centrifuging at a temperature of about 210 to 220° F. In this stage, the catalyst is retained in the bowl of the centrifuge and is thereafter discharged manually after all the wax has passed through the stage.

After removal of the catalyst, the charge stock which results is passed into a wax-hydrocarbon mixer 12 where the wax is dissolved in a predominantly paraffinic hydrocarbon solvent which, for purposes of example, can be hexane. The hexane is received from a pair of storage tanks 13 and is delivered to the mixer 12 by means of a pump 14.

Complete dissolution of the wax in the hexane is obtained in a hot solution tank 15 provided with a mixer 16 having an agitator 17 disposed in a lower part of the tank 15. An inlet 18 is provided for circulating steam or other heating medium through a jacket in the tank 15, and an outlet 19 is provided for withdrawing condensate from the steam jacket.

In the tank 15, the wax and hexane are agitated together under the influence of heat for a time sufficient to dissolve completely the oxidized charge stock from the oxidation stage 10. In the case of a hexane solvent, it will be found that about one and one half parts by weight of hexane for every part by weight of the charge stock at a temperature of 140° F., will produce a satisfactory solution. The temperature of the solution leaving the tank 15 is preferably in the range from about 130 to about 155° F., where hexane is employed, with a correspondingly lower temperature for pentane, and a higher temperature for heptane.

The solution leaving the tank 15 through the line 20 then passes through a proportioning pump 21 where it is combined with an additional amount of hexane from a line 22 being fed from the tanks 13. It has been found that the use of a dilute solution is to be preferred in that there is less tendency of entrainment of low melting point waxes in the final product. If necessary, the proportioning pump 21 may be combined with a heat exchange unit to raise the temperature of the wax-hexane mixture to the range of 130 to 155° F. In the proportioning pump, about one and two thirds additional parts by weight of fresh hexane per part of the initial hexane wax solution is added, giving a final solution of about 15% by weight of oxidized wax.

The filtration or settling characteristics of the recovered wax depends to a large extent upon the nature of the cooling which the solution of the waxes undergoes at this stage in the process. As shown in the drawings, the diluted solution of waxes in hexane passes by means of a line 23 into a series of cooling chambers indicated at numerals 24, 25, 26 and 27 respectively. In the first two coolers, 24 and 25, the hexane solution is cooled by indirect heat exchange with liquid water being circulated in the outer jacket 24a and 25a respectively of the cooler units. Both the units 24 and 25 are provided with rotatable helical scraper blades 24b and 25b, respectively, which serve to scrape any precipitated wax from the inner wall of the heat exchanger and feed it to the next succeeding cooler.

The third and fourth cooler of the series, coolers 26 and 27, receive the solution and any precipitated wax which has been scraped off. In these coolers, the hexane-wax mixture is subjected to the action of a refrigerant such as liquid ammonia introduced from a line 28. The refrigerant may be introduced directly into each cooling jacket of the cooler unit, and ammonia gas may be withdrawn therefrom through an outlet line 29.

In the cooling units, the hexane-wax mixture is cooled from an initial temperature in the range from about 130° to 155° F., to a temperature in the range from 40° F. to 80° F. For best results, it has been found that this cooling rate should be quite rapid, on the order of from 1.5 to 10° F., per minute average, if the best filtering characteristics in the final wax product are to be achieved.

The high melting point, relatively hard, oxidized microcrystalline waxes will precipitate out during such cooling to form a slurry of relatively coarse particles in a solution which includes most of the soft wax components dissolved in the remaining hexane. This slurry is passed by means of a line 31 into a surge tank 32 equipped with a stirrer 33. At intervals, portions of the slurry from the tank 32 are passed by means of a line 34 into an automatically controlled solid bowl centrifuge 35 where the solution of the soft wax components is readily separated from the coarse particles of hard wax.

The centrifuge 35 includes a bowl 35a which receives the wax suspension and as the bowl 35a is rotated, a cake builds up against the bowl. A line 36 is inserted into the liquid phase appearing in the bowl 35a to draw off the solution and when the solution is substantially withdrawn, a knife blade 35b is inserted into the bowl to scrape the deposited wax cake away from the bowl.

The filtrate solution from the centrifuge is drawn off through the line 36 and passes into a tank 37 where it is heated by means of a steam line 38 and then pumped by a pair of pumps 39 and 39a into a distillation column generally indicated at numeral 40. In the column 40, the filtrate is stripped by means of steam to separate a vapor fraction which goes to a vapor separator 41 and a bottoms fraction which may be periodically recycled or passed to storage through a line 42.

The cake recovered from the centrifuge 35 is passed into a cake melting tank 44 and is heated by means of a steam line 45 to a temperature sufficient to melt the cake. A pump 46 delivers the melted hard wax components through a line 47 and a pump 48 into a distillation column 49. Here the melted wax is subjected to steam stripping to eliminate the hexane present and to provide a bottoms fraction which may be withdrawn through a line 50 for further processing.

The overhead fraction from the column 49 passes into a vapor separator 51 and finally into a condenser 52. Similarly, the non-condensed vapors from the vapor separator 41 are passed to a condenser 53, and the outputs of the two condensers 52 and 53 are combined in a line 54 and passed to a hexane-water separator 55. In the separator 55, the hexane and water mixture is permitted to settle out, and the water is withdrawn through a line 56 while the hexane may be recycled by a line 57 back into the hexane storage tank 13.

The distillation columns 40 and 49 are preferably of the falling film evaporator type in which the solution to be distilled is pumped into the top of the column, and then flows downwardly at a controlled rate in a thin continuous film through the tubes contained in the exchanger. The steam introduced into the columns causes evaporation of the hexane from the film of solution. This type of distillation insures rapid heating and evaporation of the hexane, while minimizing the temperature required and minimizing the danger of degrading the color of the finished wax. Column 49 may be constructed of aluminum in order to further minimize the danger of affecting the color of the wax products.

The high melting point oxidized microcrystalline wax produced by this process is capable of being readily emulsified with water and of drying to form a hard, glossy film. The saponification number of the product, which is almost a direct indication of the ease of emulsification of the wax, is as high or higher than the conventional oxidized waxes. The melting point of the hard wax fraction produced according to our process is in the range shown about 180 to about 195° F. The wax is characterized by a maximum color index of seven as measured on the N. P. A. scale, an acid number between 20 and 25, and a saponification number in excess of 50.

To illustrate the differences in the crystallized product when recovered by the process of the present invention as compared to the recovery of oxidized waxes with other solvents, the following tests were performed.

Samples of oxidized wax were crystallized from various nonpolar solvents and were then examined for crystal size and type using a petrographic microscope with crossed Nicol prisms. Settling rates for the crystalline fractions were also observed visually for samples contained in tall form glass sample bottles of four ounce capacity. The samples were prepared by completely dissolving ten grams of the oxidized wax in 100 ml. of solvent at about 150° F. The samples were then cooled to room temperature with mild agitation, the cooling period lasting about 30 minutes.

The wax sample which crystallized from a hexane solution exhibited relatively thick sheet like particles the sheets being curved into either hemispherical shells or curved ribbons. In some cases, these shell like ribbons formed almost complete circles. The sheets appear to be composed of a multitude of individual crystals which are oriented in a close packed face-to-face contact structure. Apparently, this structure is responsible for the low solvent assimilation of the particles. There is a cleavage plane perpendicular to the surfaces of the sheets, indicating that one face of each individual crystal is perpendicular to the face of the sheets. Offhand, it appears that the sheet thickness is the longest dimension of the individual crystals.

We have observed different sheets with thicknesses varying from about 6 to about 40 microns, each individual sheet being very uniform in thickness. The usual range of thickness is from about 10 to about 30 microns. Broadly, the range of diameters for the hemispherical shell may extend from about 35 to 220 microns. The most common diameters are in the range from 80 to 120 microns. The same dimensional ranges are observed in the curved ribbons previously mentioned.

Fragments of the curved sheets are present in a great variety of sizes. These fragments retain one dimension which is characteristic of the thickness of the original sheet, i. e., from 6 to 40 microns. Other dimensions are in the range from 5 microns or less. The particles changed only slightly in dimensions when the hexane solvent was allowed to evaporate. The changes are estimated to be less than about 10% and are most evident by a slight change in curvature of the sheet like particles when the hexane was evaporated. All of the particles appeared to have a high ratio of volume to surface area.

The particles from a 10% solution settle to layer less than 25% of the combined volume of wax and hexane in a period of 30 minutes. The particles can be redispersed by simply inverting the sample bottle, even after a period of several days. Settling classifies the particles roughly by size with the larger particles concentrating at the bottom of the sample containers.

A portion of the same wax fraction was dissolved in benzene using 30 parts of benzene to 1 part of the wax. All particles which formed in crystallization were individual plate crystals having a thickness of less than 1 micron. The plate crystals were irregular in outline and in many cases were bent or creased in a random pattern. The plates were usually from 5 to 10 microns in width and from 20 to 30 microns in length. At high solvent dilutions, the individual crystals tended to form agglomerates, and at lower dilutions, usually less than about 8 to 1, a continuous agglomerated gel was formed by contact between the crystals. There was no tendency observed for the crystals to orient into close packed face-to-face contacts. All the crystals had a low ratio of volume to surface area as compared to the particles which formed in hexane.

The crystal agglomerates retained large volumes of benzene. The crystalline particles in a 10% solution of oxidized wax in benzene occupied about 95% of the combined volume of solvent and wax after settling for a period of two hours at room temperature. After two weeks, they still occupied about 70% of the volume. The agglomerates, which appeared to be formed by random contact between the individual crystals, did not have a rigid compact structure as did those formed in hexane. The agglomerates in benzene were rapidly deformed by weak forces such as currents in the solvent. Settling did not classify the particles according to size.

When the same test was performed using methylcyclohexane as a solvent, it was observed that a substantial portion of the wax crystallized into particles similar to those observed in hexane. The big distinction, however, arose in the fact that there was a large quantity of very small particles in the methylcyclohexane. The small particles ranged up to about 4 microns in their longest dimension. The crystalline wax particles settled more slowly in methylcyclohexane than in hexane. A slight to moderate cloud of fine particles remained suspended in the solvent above the main boundary between the solvent and the crystalline material. The cloud required about 1 to 3 days to settle completely. The main body of crystalline material moved down rapidly at first and then more slowly until it subsided to about the same volume as in hexane after 2 or 3 days.

The main difference between the hexane and the methylcyclohexane crystallization arose in the filtering characteristics. We found, for example, that crystals from methylcyclohexane solutions required 7 times longer to filter through common laboratory filter paper than was the case with crystals recovered from hexane solutions.

When the same experiment was carried out with crystallization from highly paraffinic Stoddard solvent, it was found that the crystal type and size were about equivalent to those formed in hexane, but that the settling rate was slightly lower.

It will be evident that various modifications can be made in the disclosed process without departing from the scope of the present invention.

We claim as our invention:

1. The method of fractionating an oxidized wax product capable of being dissolved completely in a hot, predominantly paraffinic hydrocarbon solvent containing from 5 to 9 carbon atoms per molecule into fractions of varying physical characteristics which comprises dissolving said wax product completely in a relatively hot predominantly paraffinic acyclic hydrocarbon solvent containing from 5 to 9 carbon atoms per molecule, cooling the resulting solution to a temperature and at a cooling rate sufficient to crystallize out a coarsely crystalline first wax fraction and leaving a second wax fraction in solution, and thereafter separating said first fraction from said second fraction.

2. The method of separating an oxidized microcrystalline wax capable of being dissolved completely in a hot predominantly paraffinic hydrocarbon solvent containing from 5 to 9 carbon atoms per molecule into a relatively hard fraction and a relatively soft and tack fraction which comprises dissolving said wax completely in a relatively hot predominantly paraffinic acyclic hydrocarbon solvent containing from 5 to 9 carbon atoms per molecule, cooling the resulting mixture at a cooling rate sufficient to crystallize out said relatively hard fraction as coarse crystals while leaving said relatively soft fraction in solution, and thereafter separating the coarse crystals of said relatively hard fraction from said solution.

3. The method of separating an oxidized microcrystalline wax capable of being dissolved completely in a hot, predominantly paraffinic hydrocarbon solvent containing from 5 to 7 carbon atoms per molecule into a relatively hard fraction and a relatively soft and tacky fraction which comprises dissolving said wax completely in a predominantly paraffinic acyclic hydrocarbon solvent containing from five to seven carbon atoms per molecule, cooling the resulting mixture at a cooling rate sufficient to crystallize out said relatively hard fraction as coarse crystals while leaving said relatively soft fraction in solution, and thereafter separating the coarse crystals of said relatively hard fraction from said solution.

4. The method of separating an oxidized microcrystalline wax capable of being dissolved completely in hot hexane into a relatively hard fraction and a relatively soft and tacky fraction which comprise dissolving said wax completely in relatively hot hexane, cooling the resulting mixture at a cooling rate sufficient to crystallize out said relatively hard fraction as coarse crystals while leaving said relatively soft fraction in solution, and thereafter separating the crystals of said relatively hard fraction from said solution.

5. The method of separating an oxidized microcrystalline wax capable of being dissolved completely in hot hexane into a relatively hard fraction and a relatively soft and tacky fraction which comprises dissolving said wax completely in hexane at a temperature in the range from about 130° to about 155° F., cooling the resulting solution to a temperature in the range from 40 to 80° F., at a rate sufficient to crystallize out a relatively hard, high melting point fraction as coarse crystals, and separating the resulting crystals from the remaining solution.

6. The method of producing an improved relatively hard oxidized microcrystalline wax which comprises oxidizing microcrystalline wax to produce a mixture of relatively hard and relatively soft wax components, dissolving said mixture completely in a predominantly paraffinic hydrocarbon solvent, cooling the resulting mixture at a cooling rate sufficient to crystallize out a relatively hard coarsely crystalline fraction while leaving a relatively soft fraction in solution, and thereafter separating the crystals of said relatively hard fraction from said solution.

7. A method of producing an improved oxidized microcrystalline wax which comprises oxidizing microcrystalline wax until said wax has a saponification number in the range from about 60 to 75, dissolving the entire oxidized wax product in a predominantly paraffinic hydrocarbon solvent, cooling the resulting mixture at a cooling rate sufficient to crystallize out a relatively hard coarsely crystalline fraction while leaving a relatively soft fraction in solution, and thereafter separating the crystals of said relatively hard fraction from said solution.

8. The method of providing an improved relatively hard oxidized microcrystalline wax which comprises oxidizing microcrystalline wax to produce a mixture of relatively hard and relatively soft wax components, dissolving the oxidation product completely in hexane, cooling the resulting mixture to a temperature in the range from about 40° to 80° F., at a cooling rate sufficient to crystallize out a relatively hard, high melting point coarsely crystalline fraction, and separating the resulting crystals from the remaining solution.

9. The method of providing an improved relatively hard oxidized microcrystalline wax which comprises oxidizing microcrystalline wax to produce a mixture of relatively hard and relatively soft wax components, dissolving the oxidation product completely in hexane at a temperature of about 130° to 155° F., cooling said mixture rapidly to a temperature in the range from about 40° F. to 80° F., thereby crystallizing out a relatively high melting point coarsely crystalline wax fraction, and separating the resulting crystals from the remaining solution.

10. The method of recovering a relatively hard, high melting point fraction of oxidized microcrystalline wax which comprises dissolving completely a mixture of oxidized microcrystalline waxes containing both relatively hard and relatively soft wax components in a hot predominantly paraffinic hydrocarbon solvent, cooling the resulting solution at a rate between 1.5 and 10° F., per minute until crystals of the harder components of said mixture crystallize out as coarse crystals while leaving the softer components in solution, and thereafter separating said crystals from the remaining liquid.

11. The method of recovering a relatively hard, high melting point fraction of oxidized microcrystalline wax which comprises dissolving completely a mixture of oxidized microcrystalline waxes containing both relatively hard and relatively soft wax components in hot hexane at a temperature between 130° and 155° F., cooling the resulting solution at a rate between 1.5 and 10° F., per minute to a temperature in the range from about 40° F., to 80° F., to thereby crystallize out the harder components of said mixture as coarse crystals while leaving the softer component in solution, and thereafter separating the resulting crystals from the remaining solution.

12. The method of recovering a hard, readily emulsifiable oxidized microcrystalline wax which comprises dissolving completely a mixture of oxidized microcrystalline waxes containing both relatively hard and relatively soft wax components in hexane at a temperature between 130° and 155° F., cooling the resulting solution at a rate between 1.5 and 10° F. per minute to a temperature in the range from about 40° F. to 80° F. to thereby crystallize out the harder components of said mixture as coarse crystals while leaving the softer component in solution, and centrifuging the solution and crystals to separate the solution from said crystals.

References Cited in the file of this patent

UNITED STATES PATENTS

| | | |
|---|---|---|
| 2,318,669 | Carr | May 11, 1943 |
| 2,682,553 | Kirk et al. | June 29, 1954 |
| 2,698,336 | Nelson | Dec. 28, 1954 |